United States Patent
Huh et al.

(10) Patent No.: US 10,228,491 B2
(45) Date of Patent: *Mar. 12, 2019

(54) RADICAL CURABLE ADHESIVE COMPOSITION, AND POLARIZING PLATE AND OPTICAL MEMBER COMPRISING SAME

(71) Applicant: LG CHEM, LTD., Seoul (KR)

(72) Inventors: Eun-Soo Huh, Daejeon (KR);
Kwang-Seung Park, Daejeon (KR);
Mi-Rin Lee, Daejeon (KR);
Sung-Hyun Kim, Daejeon (KR);
Jun-Wuk Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 249 days.

This patent is subject to a terminal disclaimer.

(21) Appl. No.: 15/025,117

(22) PCT Filed: Sep. 29, 2014

(86) PCT No.: PCT/KR2014/009129
§ 371 (c)(1),
(2) Date: Mar. 25, 2016

(87) PCT Pub. No.: WO2015/046998
PCT Pub. Date: Apr. 2, 2015

(65) Prior Publication Data
US 2016/0230053 A1    Aug. 11, 2016

(30) Foreign Application Priority Data

Sep. 30, 2013  (KR) .................. 10-2013-0116990
Sep. 26, 2014  (KR) .................. 10-2014-0129391

(51) Int. Cl.
| | | |
|---|---|---|
| *C09J 133/14* | (2006.01) | |
| *G02B 1/10* | (2015.01) | |
| *C09J 133/06* | (2006.01) | |
| *C09J 143/02* | (2006.01) | |
| *C09J 185/02* | (2006.01) | |
| *G02B 5/30* | (2006.01) | |
| *G02F 1/1335* | (2006.01) | |

(52) U.S. Cl.
CPC ............ *G02B 1/10* (2013.01); *C09J 133/066* (2013.01); *B32B 2457/20* (2013.01); *B32B 2457/202* (2013.01); *C08L 2312/00* (2013.01); *C09J 143/02* (2013.01); *C09J 185/02* (2013.01); *C09J 2203/318* (2013.01); *G02B 5/30* (2013.01); *G02B 5/3033* (2013.01); *G02F 1/1335* (2013.01); *G02F 1/133528* (2013.01); *G02F 2202/28* (2013.01); *Y10T 428/105* (2015.01); *Y10T 428/1036* (2015.01); *Y10T 428/1041* (2015.01); *Y10T 428/1059* (2015.01); *Y10T 428/1073* (2015.01); *Y10T 428/1077* (2015.01); *Y10T 428/1082* (2015.01)

(58) Field of Classification Search
CPC .... C09J 133/066; C09J 143/02; C09J 185/02; C09J 2203/318; Y10T 428/105; Y10T 428/1059; Y10T 428/1082; Y10T 428/1077; Y10T 428/1036; Y10T 428/1073; Y10T 428/1041; C08L 2312/00; G02B 1/10; G02B 5/3033; G02B 5/30; B32B 2457/20; B32B 2457/202; G02F 1/1335; G02F 1/133528; G02F 2202/28

See application file for complete search history.

(56) References Cited

U.S. PATENT DOCUMENTS

| | | | |
|---|---|---|---|
| 4,363,689 A | 12/1982 | Roesler | |
| 4,581,180 A * | 4/1986 | Yokoshima | ............. C07F 9/091 526/278 |
| 5,204,383 A | 4/1993 | Manabe et al. | |
| 2010/0253886 A1 | 10/2010 | Kim et al. | |
| 2014/0072731 A1 | 3/2014 | Seo et al. | |
| 2015/0099127 A1 | 4/2015 | Ogawa et al. | |

FOREIGN PATENT DOCUMENTS

| | | | | |
|---|---|---|---|---|
| JP | 51-123258 | A | 10/1976 | |
| JP | 03-279307 | A | 12/1991 | |
| JP | 03-279308 | A | 12/1991 | |
| JP | 04-154708 | A | 5/1992 | |
| JP | 2007-077321 | A | 3/2007 | |
| JP | 4459880 | B2 | 2/2010 | |
| JP | 2011-076058 | A | 4/2011 | |
| JP | 2011-076067 | A | 4/2011 | |
| KR | 10-2002-0056447 | A | 7/2002 | |
| KR | 10-2009-0071716 | A | 7/2009 | |
| KR | 10-2013-0040725 | A | 4/2013 | |
| KR | 10-2013-0103290 | A | 9/2013 | |
| WO | 2008-038503 | A1 | 4/2008 | |
| WO | WO 2013133539 | A1 * | 9/2013 | ................ C09J 4/00 |

* cited by examiner

*Primary Examiner* — Eli D. Strah
(74) *Attorney, Agent, or Firm* — Dentons US LLP

(57) ABSTRACT

The present invention relates to a radical-curable adhesive composition including a radical-polymerizable first compound that includes at least two hydroxyl groups in the molecule, and having hydroxyl value of 500 mg KOH/g or greater, and a polarizing plate and an optical member including the radical-curable adhesive composition.

14 Claims, No Drawings

RADICAL CURABLE ADHESIVE COMPOSITION, AND POLARIZING PLATE AND OPTICAL MEMBER COMPRISING SAME

This application is a National Stage Entry of International Application No. PCT/KR2014/009129, filed Sep. 29, 2014, and claims the benefit of Korean Application No. 10-2013-0116990, filed on Sep. 30, 2013, and Korean Application No. 10-2014-0129391, filed Sep. 26, 2014, all of which are hereby incorporated by reference in their entirety for all purposes as if fully set forth herein.

TECHNICAL FIELD

The present disclosure relates to a radical-curable adhesive composition, and a polarizing plate and an optical member including the same, and in particular, to a radical-curable adhesive composition having excellent adhesive strength and excellent heat resistance even under high humidity conditions, and a polarizing plate and an optical member including the same.

BACKGROUND ART

Polarizing plates having a structure in which a protective film is laminated on one or both surfaces of a polarizer formed with a polyvinyl alcohol (hereinafter, referred to 'PVA')-based resin dyed with dichroic dye or iodine using an adhesive have been commonly used. Triacetyl cellulose (TAC)-based films have been normally used as a polarizing plate protective film in the art, however, such TAC films have a problem of being readily deformed in high temperature and high humidity environments. Accordingly, protective films made of various materials capable of replacing TAC films have been recently developed, and for example, a method of using polyethylene terephthalate (PET), a cycloolefin polymer (COP), and an acryl-based film either alone or as a mixture thereof has been proposed.

Herein, aqueous adhesives formed with an aqueous solution of a polyvinyl alcohol-based resin are normally used as an adhesive used to attach the polarizer and the protective film. However, aqueous adhesives have a problem in that the use is limited depending on the material of a film, since adhesive strength is weak when acryl-based films or COP films and the like are used as the protective film instead of TAC. In addition to the problem of adhesive strength defects depending on the materials, the aqueous adhesive also has problems in that curls are generated in a polarizing plate due to a drying process of the aqueous adhesive, and initial optical properties are degraded when materials of the protective film used on both surfaces of a PVA element are different. Moreover, a drying process is absolutely required when the aqueous adhesive is used, and differences in moisture permeability, heat expansion and the like occur in the drying process leading to a problem of a defect rate increase. As an alternative to solve the problems described above, methods of using non-aqueous adhesives instead of aqueous adhesives have been proposed.

Non-aqueous adhesives for a polarizing plate that have been proposed so far may be divided into radical-curable adhesives and cation-curable adhesives depending on the types of curing. Cation-curable adhesives have an advantage in that excellent adhesive strength is obtained for films made of various materials, but have many disadvantages in the manufacturing process due to a low curing speed and a low degree of curing. Radical-curable adhesives having acryl amide-based compounds as a main component have been proposed in order to solve the problems of such cation-curable adhesives. However, although radical-curable adhesives having acryl amide-based compounds as a main component have a higher curing speed than cation-curable adhesives, they have problems in that curing speeds decrease, and adhesive strength is reduced under high humidity conditions. Meanwhile, a process of preparing a polarizing plate has high moisture content since the process includes a wet process in which swelling, dyeing, orientation and the like of polyvinyl alcohol films are carried out in an aqueous solution, and therefore, in order to use the acryl amide-based adhesive for a polarizing plate, the polarizer needs to be hot-air dried or go through additional processes such as surface treatment such as plasma before applying the adhesive.

Accordingly, the development of radical-curable adhesives in which a curing speed and adhesive strength are not reduced even in high humidity environments has been required so that the radical-curable adhesives may be used in a polarizing plate without a separate treatment.

Meanwhile, in another aspect, display devices having a structure in which a polarizing plate is attached to an upper and/or a lower substrate of a display panel that generates images using an adhesive have been generally used, and in order to obtain thin display devices, a method of laminating a protective film on only one surface of a polarizer using an adhesive, and directly attaching the surface of the polarizer opposite to the protective film-laminated surface to a display panel through an adhesive as a medium without a protective film has been proposed.

Herein, acryl-based adhesives are normally used as an adhesive used to attach a polarizing plate having the structure described above to a display panel. However, as for the acryl-based adhesive, at least a thickness of 20 μm is commonly required in order to maintain proper adhesive strength, and therefore, there is a problem in that the trend of display devices being thinner and lighter is not satisfied. In addition, in the case of acryl-based adhesives, an adhesive layer is generally formed using a method of applying an adhesive composition on a releasing film, drying the solvent, and then transferring the result on a sample surface, and this method has disadvantages in that the method is inconvenient when attaching a polarizing plate to a display device, and productivity decreases. Particularly, the acryl-based adhesive commonly has a glass transition temperature of 0° C. or less, and when this adhesive is directly attached to a polarizer and used, there is a problem in that heat resistance reliability is reduced, such that cracks occur in the polarizer in a thermal shock reliability test.

Accordingly, new attaching means capable of being formed to a thin film, improving productivity when attaching a polarizing plate and a display panel, and having superior heat resistance reliability has been required.

DISCLOSURE

Technical Problem

In view of the above, an object of the present invention is to provide a radical-curable adhesive composition having excellent adhesive strength even under high humidity conditions, having excellent heat resistance, capable of being formed to a thin film, and capable of being used in attaching a polarizer and a display panel as well as used in attaching a polarizer and a protective film, and a polarizing plate and an optical member including the radical-curable adhesive composition.

Meanwhile, an object of the present invention is not limited to the descriptions made above. An object of the present invention may be understood from the general contents of the present specification, and those skilled in the art to which the present invention belongs will have no difficulties in understanding additional objects of the present invention.

Technical Solution

In one aspect, the present invention provides a radical-curable adhesive composition including a radical-polymerizable first compound that includes at least two hydroxyl groups in the molecule, and having a hydroxyl value of 500 mg KOH/g or greater.

Herein, the radical-polymerizable first compound may include one or more types selected from the group consisting of compounds represented by the following [Chemical Formula 1] to [Chemical Formula 17].

[Chemical Formula 1]

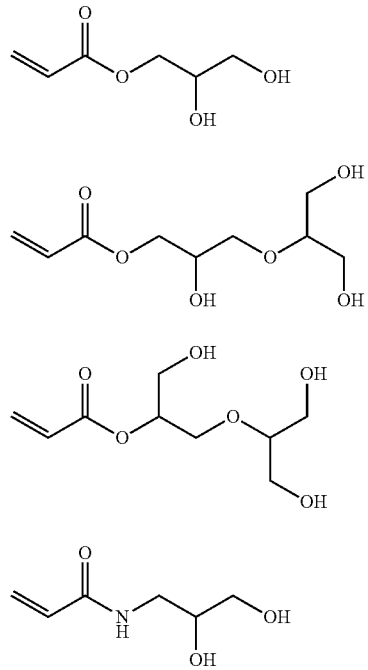

[Chemical Formula 2]

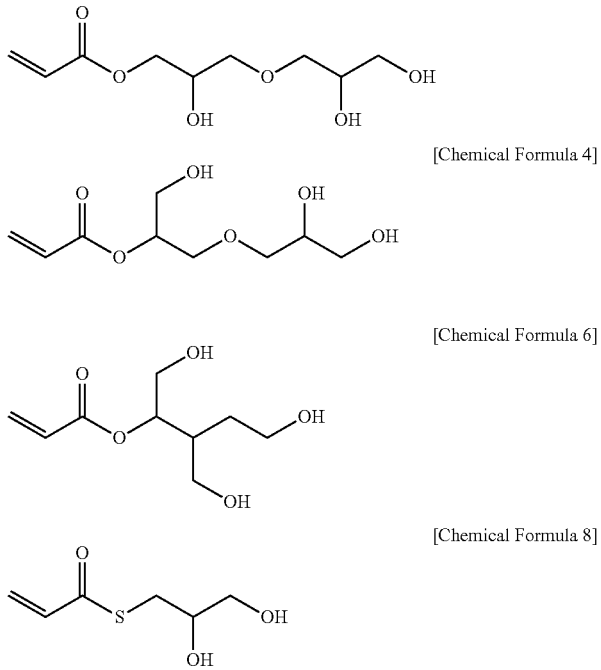

[Chemical Formula 3]

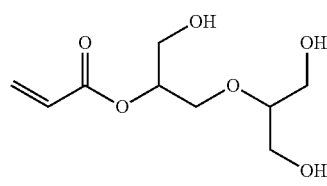

[Chemical Formula 4]

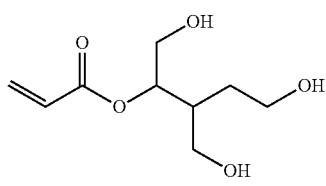

[Chemical Formula 5]

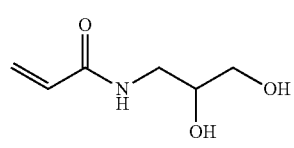

[Chemical Formula 6]

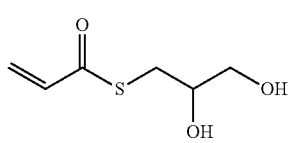

[Chemical Formula 7]

[Chemical Formula 8]

[Chemical Formula 9]

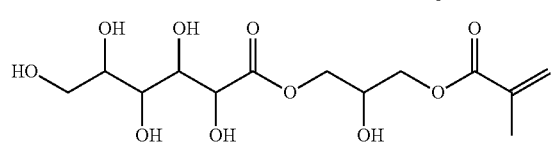

[Chemical Formula 10]

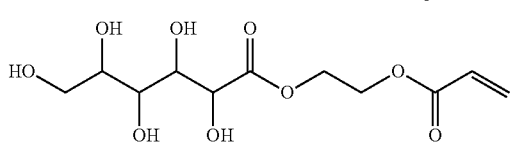

[Chemical Formula 11]

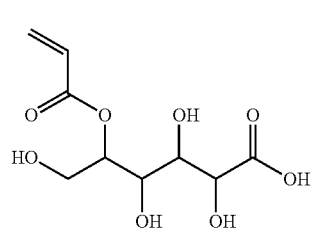

[Chemical Formula 12]

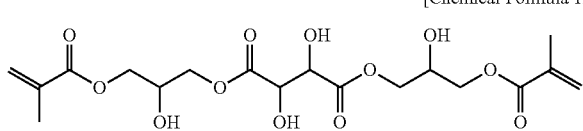

[Chemical Formula 13]

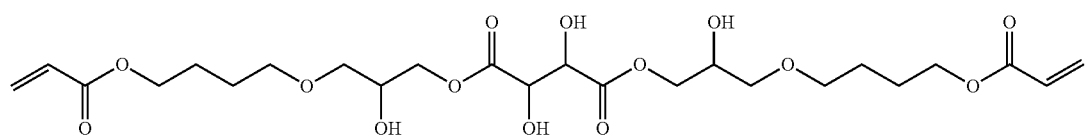

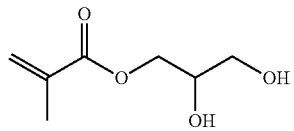

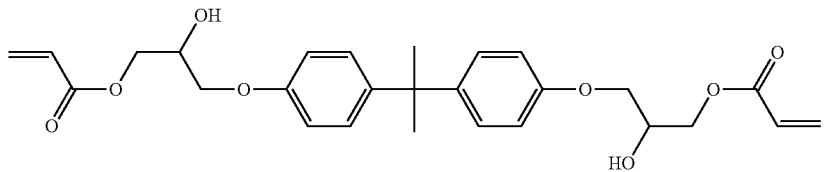

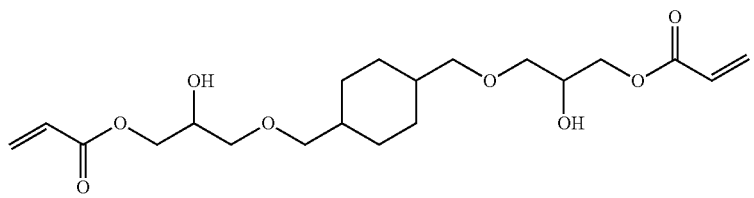

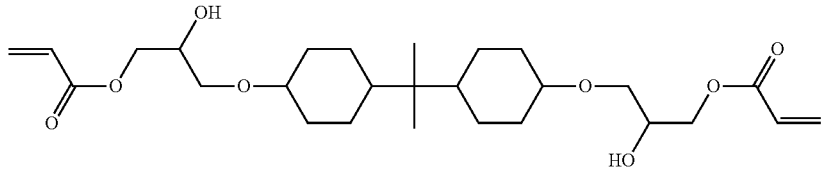

The radical-curable adhesive composition may include a (A) radical-polymerizable first compound including at least two hydroxyl groups in the molecule, a (B) radical-polymerizable second compound including at least one hydrophilic functional group in the molecule, and a (C) radical initiator.

Herein, the radical-curable adhesive composition preferably includes the (A) radical-polymerizable first compound including at least two hydroxyl groups in the molecule in 5 to 90 parts by weight; the (B) radical-polymerizable second compound including at least one hydrophilic functional group in the molecule in 5 to 90 parts by weight; and the (C) radical initiator in 0.5 to 20 parts by weight, with respect to 100 parts by weight of the radical-curable adhesive composition.

Meanwhile, the hydrophilic functional group of the second compound is preferably a hydroxyl group.

Specifically, the second compound may be represented by the following [Chemical Formula I].

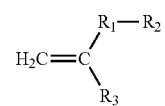

[Chemical Formula I]

In [Chemical Formula I], $R_1$ is an ester group or an ether group; $R_2$ is a $C_{1-10}$ alkyl group, a $C_{4-10}$ cycloalkyl group or a combination thereof, and herein, $R_2$ has one hydroxyl substituent in the molecule; and $R_3$ is hydrogen or a substituted or unsubstituted $C_{1-10}$ alkyl group.

More specifically, the radical-polymerizable second compound may include one or more types selected from the group consisting of compounds represented by the following [Chemical Formula 18] to [Chemical Formula 23].

[Chemical Formula 14]

[Chemical Formula 15]

[Chemical Formula 16]

[Chemical Formula 17]

[Chemical Formula 18]
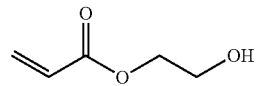

[Chemical Formula 19]
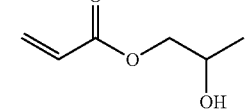

[Chemical Formula 20]
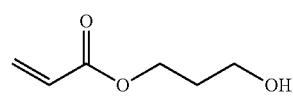

[Chemical Formula 21]
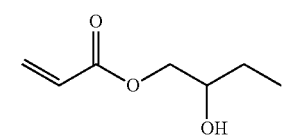

[Chemical Formula 22]

[Chemical Formula 23]
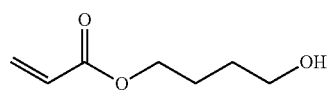

Meanwhile, the radical-curable adhesive composition may further include a (D) multifunctional (meth)acryl-based compound and/or a (E) phosphate compound including at least one (meth)acrylic group in the molecule.

Herein, the radical-curable adhesive composition may include the (A) radical-polymerizable first compound including at least two hydroxyl groups in the molecule in 5 to 90 parts by weight; the (B) radical-polymerizable second compound including at least one hydrophilic functional group in the molecule in 5 to 90 parts by weight; the (C) radical initiator in 0.5 to 20 parts by weight; the (D) multifunctional (meth)acryl-based compound in 4 to 50 parts by weight; and the (E) phosphate compound including at least one (meth)acrylic group in the molecule in 0.5 to 30 parts by weight, with respect to 100 parts by weight of the radical-curable adhesive composition.

Alternatively, the radical-curable adhesive composition may further include an (F) epoxy compound including at least one epoxy group in the molecule, and a (G) cation initiator.

Herein, the radical-curable adhesive composition may include the (A) radical-polymerizable first compound including at least two hydroxyl groups in the molecule in 5 to 90 parts by weight; the (B) radical-polymerizable second compound including at least one hydrophilic functional group in the molecule in 5 to 90 parts by weight; the (C) radical initiator in 0.5 to 20 parts by weight; the (F) epoxy compound including at least one epoxy group in the molecule in 1 to 30 parts by weight; and the (G) cation initiator in 0.5 to 15 parts by weight, with respect to 100 parts by weight of the radical-curable adhesive composition.

Meanwhile, the radical-curable adhesive composition may be cured by photocuring or heat curing.

The radical-curable adhesive composition preferably has a glass transition temperature of 50° C. or higher after curing.

In another aspect, the present invention provides a polarizing plate including a polarizer; an adhesive layer formed on at least one surface of the polarizer; and a polarizer protective film formed on the adhesive layer, wherein the adhesive layer is formed using the radical-curable adhesive composition.

In still another aspect, the present invention provides an optical member including a display panel; and a polarizer attached to an external-most surface of the display panel through a medium of an adhesive layer, wherein the adhesive layer is formed using the radical-curable adhesive composition.

In addition, the technical solution described above does not list all characteristics of the present invention. Various characteristics, and advantages and effects thereof will be understood in more detail with reference to specific embodiments described below.

Advantageous Effects

A radical-curable adhesive composition according to the present invention has excellent adhesive strength for films made of various materials, for example, TAC films, acryl-based films, COP films and PET films and the like, and is capable of stably maintaining such adhesive strength even under high humidity conditions. In addition, a radical-curable adhesive composition according to the present invention may have a high glass transition temperature after curing, and therefore, a thermally stable polarizing plate may be prepared.

Moreover, a radical-curable adhesive composition according to the present invention may also be used for attaching a polarizer and a display panel, and in this case, it may achieve thinner thickness when compared to generally-used acryl-based adhesives and the like, and an adhesive layer may be formed between the polarizer and the display panel using an in-line process, therefore, excellent productivity may be obtained. In addition, the composition has excellent heat resistance reliability compared to generally-used acryl-based adhesives and the like.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

1. Radical-Curable Adhesive Composition

As a result of extensive studies, the inventors of the present invention have found that an adhesive prepared using a radical-curable adhesive composition that includes a radical-polymerizable first compound including at least two hydroxyl groups in the molecule, and has a hydroxyl value of 500 mg KOH/g may solve the problems discussed above, and completed the present invention.

More specifically, a radical-curable adhesive composition of the present invention includes a radical-polymerizable first compound including at least two hydroxyl groups in the molecule, and has a hydroxyl value of 500 mg KOH/g or greater.

1-1. Hydroxyl Value of Composition

First, the radical-curable adhesive composition according to the present invention has a total hydroxyl value of 500 mg KOH/g or greater, preferably approximately 500 to 900 mg KOH/g, and more preferably approximately 500 to 850 mg KOH/g. When the radical-curable adhesive composition has a high hydroxyl value, there is an advantage in that an adhesive formed using this composition may stably maintain high adhesive strength with a polarizer even under rather high humidity conditions, and in addition, there is an advantage in that thermal stability may be secured since such a high hydroxyl value causes strong binding power in the cured adhesive, which leads to a high glass transition temperature.

Meanwhile, the hydroxyl value means a mg number of potassium hydroxide (KOH) required for neutralizing acetic acid bonded to a hydroxyl group when 1 g of a sample is acetylated, and a measurement method is not particularly limited. For example, the hydroxyl value in the sample may be calculated through the following Equation (1).

(Molecular Weight of KOH×Number of —OH in Sample×1000)/Molecular Weight of Sample     Equation (1)

1-2. First Compound

Next, the radical-curable adhesive composition of the present invention includes a radical-polymerizable first compound including at least two hydroxyl groups in the molecule. Herein, by the radical-polymerizable first compound having at least two hydroxyl groups in the molecule, excellent adhesive strength with a polarizer may be obtained through hydrogen bonding, and the hydroxyl value of the radical-curable composition may increase. In addition, the use of the first compound is not particularly limited as long as the compound is capable of radical polymerization by having at least one radical polymerizable group, for example, having a carbon-carbon unsaturated double bond, in the molecule.

Meanwhile, the radical-polymerizable first compound preferably includes a (meth)acryloyl group as the radical polymerizable group, since radical polymerization may be accomplished more excellently in this case. Herein, the (meth)acryloyl group means a radical polymerizable group represented by the following [Chemical Formula A].

[Chemical Formula A]

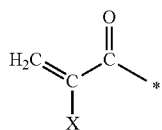

In [Chemical Formula A], X is hydrogen or methyl, and is linking to other atoms in the radical-polymerizable first compound such as carbon, oxygen, sulfur and nitrogen at *.

More specifically, in the present invention, although not limited thereto, the radical-polymerizable first compound may include one or more types selected from the group consisting of compounds represented by the following [Chemical Formula 1] to [Chemical Formula 17].

[Chemical Formula 1] [Chemical Formula 2] [Chemical Formula 3] [Chemical Formula 4] [Chemical Formula 5] [Chemical Formula 6] [Chemical Formula 7] [Chemical Formula 8]

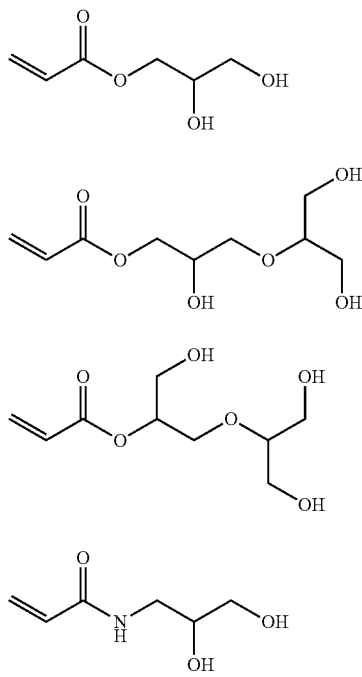
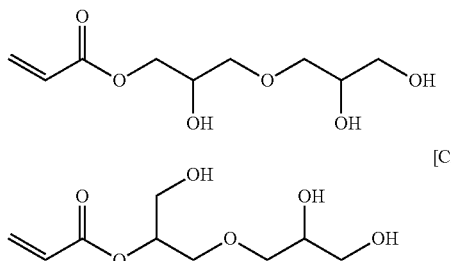
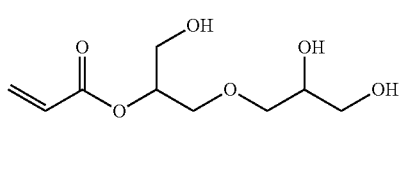
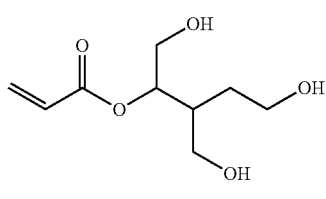
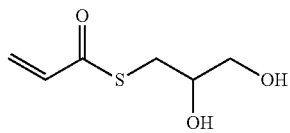

[Chemical Formula 9] [Chemical Formula 10]

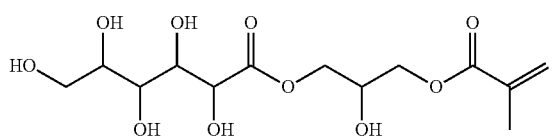
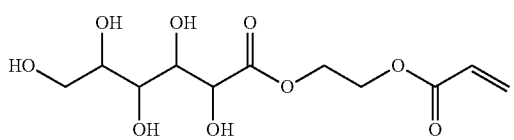

[Chemical Formula 11] [Chemical Formula 12]

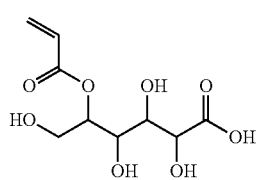
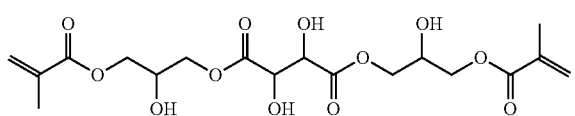

[Chemical Formula 13]

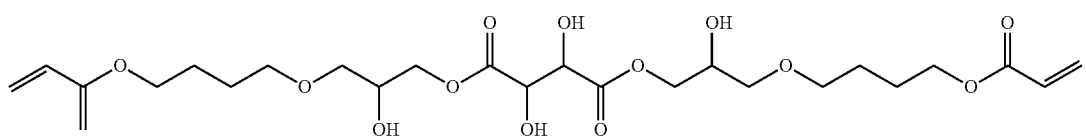

[Chemical Formula 14]

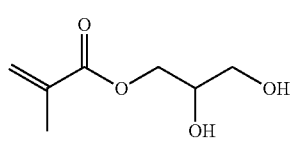

[Chemical Formula 15]

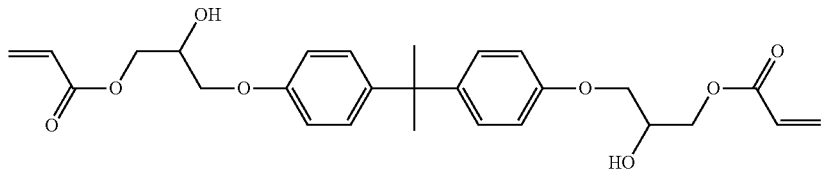

[Chemical Formula 16]

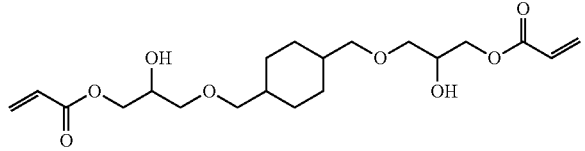

[Chemical Formula 17]

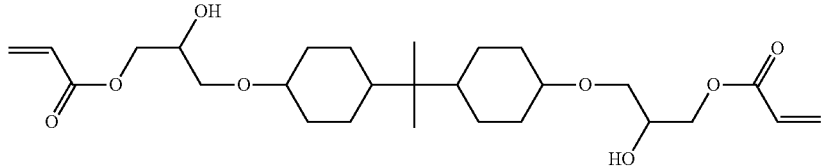

Meanwhile, when UV cured, the radical-polymerizable first compound of the present invention preferably includes a radical initiator to be described later. However, the radical-polymerizable first compound of the present invention may be heat cured, and in this case, the radical-curable adhesive composition including the first compound may be heat cured, therefore, there are advantages in that a separate photoradical initiator is not required, and an adhesive layer that is more thermally stable may be formed.

1-3. Second Compound and Radical Initiator

Meanwhile, the radical-curable adhesive composition of the present invention may further include a radical-polymerizable second compound including at least one hydrophilic functional group in the molecule and a radical initiator in order to further improve adhesive strength and to further enhance a curing rate by facilitating radical polymerization. In other words, the radical-curable adhesive composition of the present invention may include a (A) radical-polymerizable first compound including at least two hydroxyl groups in the molecule, a (B) radical-polymerizable second compound including at least one hydrophilic functional group in the molecule, and a (C) radical initiator.

Herein, by the (B) radical-polymerizable second compound including at least one hydrophilic functional group in the molecule having at least one hydrophilic functional group in the molecule, adhesive strength with a polarizer may be obtained through hydrogen bonding, and in addition, the use of the second compound is not particularly limited as long as the compound is capable of radical polymerization by having a carbon-carbon unsaturated double bond in the molecule. However, in the present specification, the radical-polymerizable second compound including at least one hydrophilic functional group in the molecule means excluding the radical-polymerizable first compound including at least two hydroxyl groups in the molecule.

Meanwhile, the hydrophilic functional group is preferably a hydroxyl group in order to obtain excellent adhesive strength and a high hydroxyl value. For example, in the present invention, the (B) radical-polymerizable second compound including at least one hydrophilic functional group in the molecule is, although not limited thereto, a compound represented by the following [Chemical Formula I].

[Chemical Formula I]

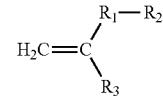

In [Chemical Formula I], $R_1$ is an ester group or an ether group; $R_2$ is a $C_{1\text{-}10}$ alkyl group, a $C_{4\text{-}10}$ cycloalkyl group or a combination thereof, and herein $R_2$ has one hydroxyl substituent in the molecule; and $R_3$ is hydrogen or a substituted or unsubstituted $C_{1\text{-}10}$ alkyl group.

Herein, in $R_2$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_2$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond. Meanwhile, examples of the cycloalkyl group may include, but are not limited to, a cyclopentane ring, a cyclohexane ring and the like.

Meanwhile, the hydroxyl group may substitute any position of the alkyl group or the cycloalkyl group. For example, the hydroxyl group may position at the end of the alkyl group, or in the middle of the alkyl group. Meanwhile, the rest of the hydrogen atoms included in the alkyl group or the cycloalkyl group may be substituted with any substituent.

In addition, in $R_3$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, examples of the compound represented by [Chemical Formula I] may include, but are not limited to, one or more types of compounds selected from compounds represented by the following [Chemical Formula 18] to [Chemical Formula 23].

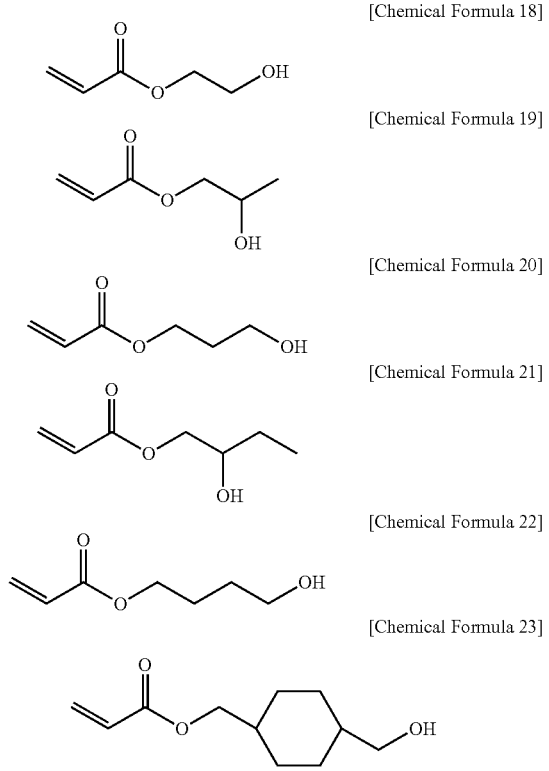

[Chemical Formula 18]

[Chemical Formula 19]

[Chemical Formula 20]

[Chemical Formula 21]

[Chemical Formula 22]

[Chemical Formula 23]

In addition, the (C) radical initiator is for enhancing a curing rate by facilitating radical polymerization, and radical initiators generally used in the art may be used without limit as the radical initiator.

More specifically, examples of the radical initiator may include one or more types selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methyl benzoylformate, oxy-phenyl-acetic acid-2-[2-oxo-2-phenyl-acetoxyethoxy]-ethyl ester, oxy-phenyl-acetic acid-2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide and phenylbis(2,4,6-trimethylbenzoyl)-phosphine oxide. Particularly, in the present invention, phenylbis(2,4,6-trimethylbenzoyl)-phosphine oxide may be preferably used.

Meanwhile, the radical-curable adhesive composition of the present invention more preferably includes the (A) radical-polymerizable first compound including at least two hydroxyl groups in the molecule in 5 to 90 parts by weight; the (B) radical-polymerizable second compound including at least one hydrophilic functional group in the molecule in 5 to 90 parts by weight; and the (C) radical initiator in 0.5 to 20 parts by weight, with respect to 100 parts by weight of the radical-curable adhesive composition.

More specifically, the (A) radical-polymerizable first compound including at least two hydroxyl groups in the molecule may be included in approximately 10 to 90 parts by weight, preferably included in approximately 10 to 80 parts by weight, and more preferably included in approximately 20 to 80 parts by weight, with respect to 100 parts by weight of the whole adhesive composition. When the content of the (A) compound satisfies the above range, excellent adhesive strength and a high glass transition temperature may all be secured.

In addition, the (B) radical-polymerizable second compound including at least one hydrophilic functional group in the molecule may be included in approximately 5 to 90 parts by weight, preferably included in approximately 5 to 80 parts by weight, and more preferably included in approximately 10 to 80 parts by weight, with respect to 100 parts by weight of the whole adhesive composition. When the content of the (B) compound satisfies the above range, the radical-curable adhesive composition of the present invention may have particularly superior adhesive strength.

Furthermore, the (C) radical initiator may be included in approximately 0.5 to 20 parts by weight, preferably included in approximately 0.5 to 15 parts by weight, and more preferably included in approximately 0.5 to 10 parts by weight, with respect to 100 parts by weight of the whole adhesive composition. When the content of the radical initiator satisfies the above range, curing of an adhesive may be smoothly accomplished.

1-4. Additional Composition 1 for Improving Water Resistance

Meanwhile, the radical-curable adhesive composition of the present invention may further include a (D) multifunctional (meth)acryl-based compound and/or a (E) phosphate compound including at least one (meth)acrylic group in the molecule for exhibiting stable physical properties even in high humidity environments by increasing the degree of cross-linkage in an adhesive layer and thereby improving water resistance.

For example, the radical-curable adhesive composition of the present invention may include the (A) radical-polymerizable first compound including at least two hydroxyl groups in the molecule; the (C) radical initiator; a (D) multifunctional (meth)acryl-based compound and/or a (E) phosphate compound including at least one (meth)acrylic group in the molecule.

Alternatively, the radical-curable adhesive composition of the present invention may include the (A) radical-polymerizable first compound including at least two hydroxyl groups in the molecule; the (B) radical-polymerizable second compound including at least one hydrophilic functional group in the molecule; the (C) radical initiator; a (D) multifunctional (meth)acryl-based compound and/or a (E) phosphate compound including at least one (meth)acrylic group in the molecule.

Herein, as the (D) multifunctional (meth)acryl-based compound, various multifunctional (meth)acryl-based compounds widely known in the art may be used without limit. However, in the present specification, except for multifunctional (meth)acryl-based compounds listed below as examples, compounds corresponding to the (A) compound and the (B) compound described above, and the (E) compound to be described later are not included in the multifunctional (meth)acryl-based compound.

In the present invention, examples of the (D) multifunctional (meth)acryl-based compound may include ethylene glycol di(meth)acrylate, 1,3-butanediol di(meth)acrylate, 1,4-butanediol di(meth)acrylate, 1,6-hexanediol di(meth)

acrylate, 1,9-nonanediol di(meth)acrylate, neopentyl glycol di(meth)acrylate, trimethylolpropane di(meth)acrylate, pentaerythritol di(meth)acrylate, ditrimethylolpropane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxyl pivalic acid ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogen-added dicyclopentadienyl di(meth)acrylate, tricyclodecane dimethanol di(meth)acrylate, 1,3-dioxane-2,5-diyl di(meth)acrylate, di(meth)acrylate of 2-(2-hydroxy-1,1-dimethylethyl)-5-ethyl-5-hydroxymethyl-1,3-dioxane, tris(hydroxyethyl)isocyanurate di(meth)acrylate, glycerin tri(meth)acrylate, trimethylolpropane tri(meth)acrylate, ditrimethylolpropane tri(meth)acrylate, ditrimethylolpropane tetra(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and the like. These may be used either alone or as a mixture thereof.

Meanwhile, although not limited thereto, the (D) multifunctional (meth)acryl-based compound more preferably includes one or more types selected from the group consisting of compounds represented by the following [Chemical Formula II] to [Chemical Formula IV]. In this case, the water resistance improvement effect is more superior.

[Chemical Formula II]

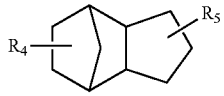

In [Chemical Formula II], $R_4$ and $R_5$ are each independently a (meth)acryloyloxy group or a (meth)acryloyloxyalkyl group.

Herein, in $R_4$ and $R_5$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

[Chemical Formula III]

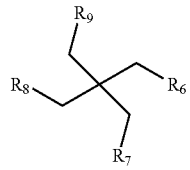

In [Chemical Formula III], $R_6$, $R_7$ and $R_8$ are each independently a (meth)acryloyloxy group or a (meth)acryloyloxyalkyl group, and $R_9$ is a (meth)acryloyloxy group, a (meth)acryloyloxyalkyl group, a hydroxyl group, or a substituted or unsubstituted $C_{1-10}$ alkyl group.

Herein, in $R_6$, $R_7$, $R_8$ and $R_9$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

In addition, in $R_9$, the alkyl group means a linear or branched hydrocarbon part of 1 to 10, 1 to 8, or 1 to 4 carbon atoms, and one or more hydrogen atoms included in the alkyl group may be substituted with any substituent.

[Chemical Formula IV]

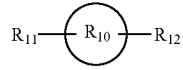

In [Chemical Formula IV], $R_{10}$ is substituted or unsubstituted $C_{1-10}$ alkylene, and $R_{11}$ and $R_{12}$ are each independently a (meth)acryloyloxy group or a (meth)acryloyloxyalkyl group.

Herein, in $R_{10}$, the alkylene means a linear or branched divalent hydrocarbon part of 1 to 10, 1 to 8, or 1 to 6 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene may be substituted with any substituent.

In addition, in $R_{11}$ and $R_{12}$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

More specifically, although not limited thereto, the (D) multifunctional (meth)acryl-based compound may include one or more types of compounds selected from the group consisting of compounds represented by the following [Chemical Formula 24] to [Chemical Formula 27].

[Chemical Formula 24]

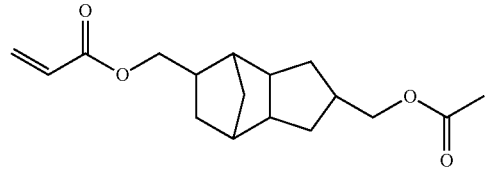

[Chemical Formula 25]

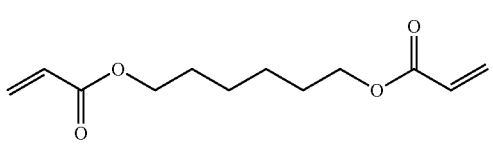

[Chemical Formula 26]

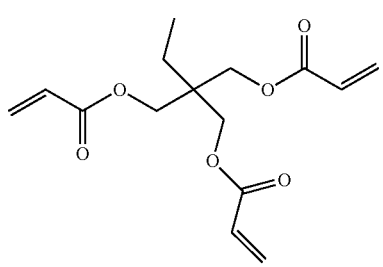

[Chemical Formula 27]

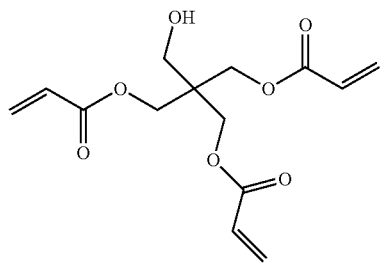

In addition, the (E) phosphate compound including at least one (meth)acrylic group in the molecule may be used without limit as long as the compound is a phosphate compound including at least one (meth)acrylic group in the molecule. For example, although not limited thereto, the (E) phosphate compound including at least one (meth)acrylic group in the molecule may be compounds represented by the following [Chemical Formula V].

[Chemical Formula V]

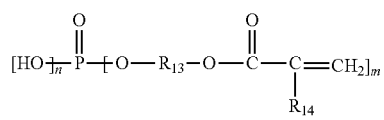

In [Chemical Formula V], $R_{13}$ is a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_{14}$ is hydrogen or a methyl group; n is an integer of 0 to 2, m is an integer of 1 to 3, and n+m is 3.

Herein, in $R_{13}$, the alkylene group means a linear or branched divalent hydrocarbon part of 1 to 10, 1 to 8, or 1 to carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_{13}$, the cycloalkylene group means a nonaromatic divalent monocyclic, bicyclic or tricyclic hydrocarbon part of 4 to 14, 4 to 10, or 4 to 6 ring carbons, and the cycloalkylene group in the present specification may include at least one unsaturated bond in the molecule. Meanwhile, examples of the cycloalkylene group may include, but are not limited to, a divalent cyclopentane ring, a divalent cyclohexane ring and the like. One or more hydrogen atoms included in the cycloalkylene group may be substituted with any substituent.

Furthermore, in $R_{13}$, the arylene group means a divalent monocyclic, bicyclic or tricyclic aromatic hydrocarbon part having 6 to 14, or 6 to 12 ring atoms, and examples thereof may include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, among the groups shown above, $R_{13}$ is, although not limited thereto, preferably a substituted or unsubstituted $C_{1-10}$ alkylene group, more preferably a substituted or unsubstituted $C_{1-8}$ alkylene group, and even more preferably a substituted or unsubstituted $C_{1-4}$ alkylene group.

In addition, in n and m, it is more preferable that n be an integer of 1 or 2, m be an integer of 1 or 2 and n+m be 3, and it is particularly preferable that n be 2, m be 1 and n+m be 3.

More specifically, although not limited thereto, the (E) phosphate compound including at least one (meth)acrylic group in the molecule may include one or more types of compounds selected from the group consisting of compounds represented by the following [Chemical Formula 28] to [Chemical Formula 33].

[Chemical Formula 28]

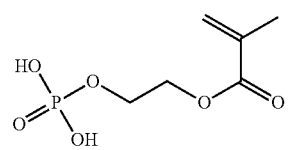

[Chemical Formula 29]

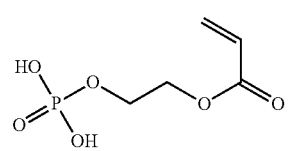

[Chemical Formula 30]

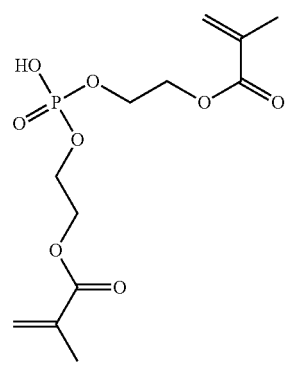

[Chemical Formula 31]

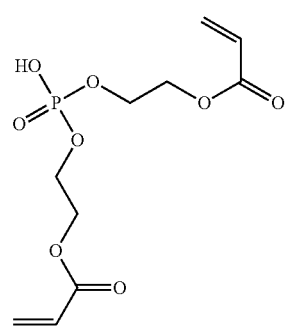

[Chemical Formula 32]

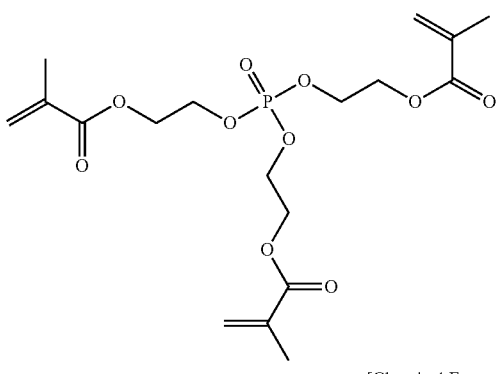

[Chemical Formula 33]

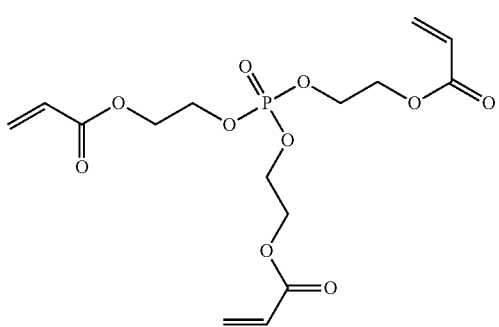

Meanwhile, when the radical-curable adhesive composition of the present invention further includes the (D) compound and/or the (E) compound as described above, the content of the (A) radical-polymerizable first compound including at least two hydroxyl groups in the molecule may be approximately 10 to 90 parts by weight, preferably approximately 10 to 80 parts by weight, and more preferably approximately 20 to 80 parts by weight, with respect to 100 parts by weight of the whole adhesive composition. When the content of the (A) compound satisfies the above range, excellent adhesive strength and water resistance may all be secured.

In addition, the content of the (B) radical-polymerizable second compound including at least one hydrophilic functional group in the molecule may be approximately 5 to 90 parts by weight, preferably approximately 5 to 80 parts by weight, and more preferably approximately 10 to 80 parts by weight, with respect to 100 parts by weight of the whole adhesive composition. When the content of the (B) compound satisfies the above range, the radical-curable adhesive composition of the present invention may have particularly superior adhesive strength.

Furthermore, the content of the (C) radical initiator may be approximately 0.5 to 20 parts by weight, preferably approximately 0.5 to 15 parts by weight, and more preferably approximately 0.5 to 10 parts by weight, with respect to 100 parts by weight of the whole adhesive composition. When the content of the radical initiator satisfies the above range, curing of an adhesive may be smoothly accomplished.

In addition, the content of the (D) multifunctional (meth) acryl-based compound may be approximately 4 to 50 parts by weight, preferably approximately 5 to 40 parts by weight, and more preferably approximately 6 to 40 parts by weight, with respect to 100 parts by weight of the whole radical-curable adhesive composition. When the content of the (D) compound satisfies the above range, the radical-curable adhesive composition of the present invention may secure excellent adhesive strength and water resistance.

Furthermore, the content of the (E) phosphate compound including at least one (meth)acrylic group in the molecule may be approximately 0.5 to 30 parts by weight, preferably approximately 0.5 to 20 parts by weight, and more preferably approximately 0.5 to 15 parts by weight, with respect to 100 parts by weight of the whole radical-curable adhesive composition. When the content of the (E) compound satisfies the above range, the radical-curable adhesive composition of the present invention may secure excellent adhesive strength and water resistance.

For example, the radical-curable adhesive composition may include the (A) radical-polymerizable first compound including at least two hydroxyl groups in the molecule in 5 to 90 parts by weight; the (B) radical-polymerizable second compound including at least one hydrophilic functional group in the molecule in 5 to 90 parts by weight; the (C) radical initiator in 0.5 to 20 parts by weight; the (D) multifunctional (meth)acryl-based compound in 4 to 50 parts by weight; and/or the (E) phosphate compound including at least one (meth)acrylic group in the molecule in 0.5 to 30 parts by weight, with respect to 100 parts by weight of the radical-curable adhesive composition.

1-5. Additional Composition 2 for Improving Water Resistance

Meanwhile, the radical-curable adhesive composition of the present invention may further include an (F) epoxy compound including at least one epoxy group in the molecule and a (G) cation initiator for improving water resistance and thereby exhibiting stable physical properties even in high humidity environments.

For example, the radical-curable adhesive composition of the present invention may include the (A) radical-polymerizable first compound including at least two hydroxyl groups in the molecule; an (F) epoxy compound including at least one epoxy group in the molecule; and a (G) cation initiator.

Alternatively, the radical-curable adhesive composition of the present invention may include the (A) radical-polymerizable first compound including at least two hydroxyl groups in the molecule; the (B) radical-polymerizable second compound including at least one hydrophilic functional group in the molecule; the (C) radical initiator; an (F) epoxy compound including at least one epoxy group in the molecule; and a (G) cation initiator.

Herein, the (F) epoxy compound including at least one epoxy group in the molecule is not particularly limited as long as the compound has at least one epoxy group in the molecule, and examples thereof may include an aromatic epoxy-based compound, a hydrogenated epoxy-based compound, an alicyclic epoxy-based compound, an epoxy group-containing (meth)acryl-based compound and the like. These may be used either alone or as a mixture of two or more.

Herein, the aromatic epoxy-based compound means an epoxy-based compound including at least one aromatic hydrocarbon ring in the molecule, and examples thereof may include, but are not limited to, a bisphenol-type epoxy resin such as diglycidyl ether of bisphenol A, diglycidyl ether of bisphenol F and diglycidyl ether of bisphenol S; a novolac-type epoxy resin such as a phenol novolac epoxy resin, a cresol novolac epoxy resin and a hydroxybenzaldehyde phenol novolac epoxy resin; a multifunctional epoxy resin such as glycidyl ether of tetrahydroxyphenylmethane, glycidyl ether of tetrahydroxybenzophenone and epoxylated polyvinylphenol, and the like.

In addition, the hydrogenated epoxy-based compound means an epoxy-based compound obtained by selectively carrying out a hydrogenation reaction on the aromatic epoxy-based compound under pressure in the presence of a catalyst.

Furthermore, the alicyclic epoxy-based compound means an epoxy-based compound in which an epoxy group is formed between two adjacent carbon atoms forming an aliphatic hydrocarbon ring, and examples thereof may include, but are not limited to, 2-(3,4-epoxy)cyclohexyl-5,5-spiro-(3,4-epoxy)cyclohexane-m-dioxane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, vinylcyclohexane dioxide, bis(3,4-epoxycyclohexylmethyl)adipate, bis(3,4-epoxy-6-methylcyclohexylmethyl)adipate, exo-exobis(2,3-epoxycyclopentyl)ether, endo-exobis(2,3-epoxycyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxyhexahydro-4,7-methanoindane, o-(2,3-epoxy)cyclopentylphenyl-2,3-epoxypropylether), 1,2-bis[5-(1,2-epoxy)-4,7-hexahydromethanoindanoxyl]ethane cyclopentenylphenyl glycidyl ether, methylenebis(3,4-epoxycyclohexane)ethylene glycol di(3,4-epoxycyclohexylmethyl)ether, ethylenebis(3,4-epoxycyclohexanecarboxylate) and the like.

In addition, the epoxy group-containing (meth)acryl-based compound means a compound including both an epoxy group and a (meth)acryloyloxy group in the molecule, and examples thereof may include, but are not limited to, glycidyl acrylate, 2-methylglycidyl acrylate, 3,4-epoxybutyl acrylate, 6,7-epoxyheptyl acrylate, 3,4-epoxycyclohexyl acrylate, glycidyl methacrylate, 2-methyl glycidyl methacrylate, 3,4-epoxybutyl methacrylate, 6,7-epoxyheptyl methacrylate, 3,4-epoxycyclohexyl methacrylate, 4-hydroxybutyl acrylate glycidyl ether and the like.

Meanwhile, the (F) epoxy compound including at least one epoxy group in the molecule preferably include one or more selected from the group consisting of an alicyclic epoxy-based compound and an epoxy group-containing (meth)acryl-based compound. Herein, among these, the alicyclic epoxy-based compound is particularly preferably an epoxy-based compound having at least two epoxy groups and at least two alicyclic rings in the molecule, for example, 3,4-epoxycyclohexylmethyl-3,4-epoxycyclohexane carboxylate and the like, and the epoxy group-containing (meth)acryl-based compound is particularly preferably a glycidyl(meth)acryl-based compound, for example, glycidyl acrylate, glycidyl methacrylate and the like. In this case, the water resistance improvement effect of the adhesive composition of the present invention is very superior.

In addition, the (G) cation initiator is a compound generating an acid (H+) by active energy rays, and the cation initiator capable of being used in the present invention preferably includes, for example, a sulfonium salt or an iodonium salt. Specific examples of the photoacid generator including a sulfonium salt or an iodonium salt may include one or more types selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium) dihexafluoroantimonate and (thiodi-4,1-phenylene)bis(diphenylsulfonium)dihexafluorophosphate, but are not limited thereto.

Meanwhile, when the radical-curable adhesive composition of the present invention further includes the (F) compound and the (G) cation initiator as described above, the content of the (A) radical-polymerizable first compound including at least two hydroxyl groups in the molecule may be approximately 10 to 90 parts by weight, preferably approximately 10 to 80 parts by weight, and more preferably approximately 20 to 80 parts by weight, with respect to 100 parts by weight of the whole adhesive composition. When the content of the (A) compound satisfies the above range, excellent adhesive strength and a high glass transition temperature may all be secured.

In addition, the content of the (B) radical-polymerizable second compound including at least one hydrophilic functional group in the molecule may be approximately 5 to 90 parts by weight, preferably approximately 5 to 80 parts by weight, and more preferably approximately 10 to 80 parts by weight, with respect to 100 parts by weight of the whole adhesive composition. When the content of the (B) compound satisfies the above range, the radical-curable adhesive composition may have particularly superior adhesive strength.

Furthermore, the content of the (C) radical initiator may be approximately 0.5 to 20 parts by weight, preferably approximately 0.5 to 15 parts by weight, and more preferably approximately 0.5 to 10 parts by weight, with respect to 100 parts by weight of the whole adhesive composition. When the content of the radical initiator satisfies the above range, curing of an adhesive may be smoothly accomplished.

In addition, the content of the (F) epoxy compound including at least one epoxy group in the molecule may be approximately 1 to 30 parts by weight, preferably approximately 4 to 25 parts by weight, and more preferably approximately 5 to 20 parts by weight, with respect to 100 parts by weight of the whole radical-curable adhesive composition. When the content of the (F) compound satisfies the above range, the radical-curable adhesive composition of the present invention may secure excellent adhesive strength and water resistance.

Furthermore, the content of the (G) cation initiator may be approximately 0.5 to 15 parts by weight, preferably approximately 0.5 to 12 parts by weight, and more preferably approximately 0.5 to 10 parts by weight, with respect to 100 parts by weight of the whole radical-curable adhesive composition. When the content of the cation initiator satisfies the above range, curing of an adhesive may be smoothly accomplished.

For example, the radical-curable adhesive composition may include the (A) radical-polymerizable first compound including at least two hydroxyl groups in the molecule in 5 to 90 parts by weight; the (B) radical-polymerizable second compound including at least one hydrophilic functional group in the molecule in 5 to 90 parts by weight; the (C) radical initiator in 0.5 to 20 parts by weight; the (F) epoxy compound including at least one epoxy group in the molecule in 1 to 30 parts by weight; and the (G) cation initiator in 0.5 to 15 parts by weight, with respect to 100 parts by weight of the radical-curable adhesive composition.

1-6. Physical Properties of Radical-Curable Adhesive Composition

Meanwhile, the radical-curable adhesive composition according to the present invention preferably has a glass transition temperature of 50° C. or higher after curing. For example, the temperature may be 55 to 200° C., or 60 to 200° C. In this case, the adhesive layer is thermally very stable, and sufficient heat resistance may be secured.

In addition, the radical-curable adhesive composition according to the present invention preferably has viscosity of approximately 10 to 200 cP, or 20 to 100 cP. When the viscosity of the adhesive composition satisfies the above range, there is an advantage in that the adhesive layer may be formed to be thin, and workability is excellent due to low viscosity of the adhesive layer.

Meanwhile, the radical-curable adhesive composition of the present invention described above has excellent adhesive strength for films made of various materials, and in addition to this, maintains adhesive strength for a long period of time even in high humidity environments, and is thermally stable due to a high glass transition temperature after curing, and therefore, the radical-curable adhesive composition of the present invention may be favorably used for a polarizing plate.

In addition, the radical-curable adhesive composition of the present invention described above may also exhibit excellent adhesive strength between a polarizer and a display panel, may form an adhesive layer as a thin film, has excellent heat resistance reliability, and furthermore, has excellent productivity in that the adhesive layer may be formed between the polarizer and the display panel using an in-line process, and therefore, the radical-curable adhesive composition of the present invention may also be favorably used when directly attaching a polarizer to a display panel.

Hereinafter, a polarizing plate and an optical member including the radical-curable adhesive composition of the present invention will be specifically described.

2. Polarizing Plate

First, a polarizing plate according to the present invention will be described.

A polarizing plate of the present invention includes a polarizer; an adhesive layer formed on at least one surface of the polarizer; and a protective film formed on the adhesive layer, wherein the adhesive layer is formed using the radical-curable adhesive composition of the present invention described above.

2-1. Polarizer

First, the polarizer is not particularly limited, and polarizers well known in the art, for example, films formed with polyvinyl alcohol (PVA) including iodine or dichroic dye may be used. The polarizer may be prepared by dyeing a PVA film with iodine or dichroic dye, however, the preparation method is not particularly limited. In the present specification, a polarizer means a state not including a protective film, and a polarizing plate means a state including a polarizer and a protective film.

2-2. Adhesive Layer

Next, the adhesive layer is formed using the radical-curable adhesive composition according to the present invention described above, and may be formed using methods well known in the art. For example, a method of forming an adhesive layer by applying an adhesive composition on one surface of a polarizer or a protective film, laminating the polarizer and the protective film, and then curing the result may be used. Herein, the application may be carried out using coating methods well known in the art, such as spin coating, bar coating, roll coating, gravure coating, and blade coating.

Meanwhile, the curing may be carried out by photocuring, more specifically, irradiating active energy rays such as ultraviolet rays, visible rays, an electron beam and X-rays. For example, the curing may be carried out using a method of irradiating ultraviolet rays of approximately 10 to 2500 mJ/cm$^2$ using an ultraviolet ray irradiator (metal halide lamp).

Alternatively, the curing may also be carried out by heat curing, more specifically, heat curing at a curing temperature of 80° C. or higher. Herein, in the heat curing, a known amine-based initiator may be additionally added to the composition as necessary for increasing the curing speed.

In addition, as the curing, the heat curing may be additionally carried out after the photocuring, or the photocuring may be additionally carried out after the heat curing.

Meanwhile, the adhesive layer may have a thickness of approximately greater than 0 and less than or equal to 10 μm, and preferably approximately 0.1 to 10 μm or 0.1 to 5 μm. When the adhesive layer is too thin, uniformity and adhesive strength of the adhesive layer may be reduced, and when the adhesive layer is too thick, there may be a problem of a polarizing plate exterior getting wrinkled.

2-3. Protective Film

Next, the protective film is used for supporting and protecting a polarizer, and protective films made of various materials generally known in the art, such as cellulose-based films, polyethylene terephthalate (PET) films, cycloolefin polymer (COP) films and acryl-based films, may be used without limit. Among these, using an acryl-based film is particularly preferable considering optical properties, durability, economic efficiency and the like.

Meanwhile, an acryl-based film capable of being used in the present invention may be obtained by extrusion molding materials to be molded including a (meth)acrylate-based resin as a main component. Herein, the (meth)acrylate-based resin is a material having a resin including a (meth)acrylate-based unit as a main component, and the concept also includes not only a homopolymer resin formed with a (meth)acrylate-based unit, but also a copolymer resin copolymerizing other monomer units in addition to a (meth)acrylate-based unit, and a blend resin blending other resins to such a (meth)acrylate-based resin.

Meanwhile, the (meth)acrylate-based unit may be, for example, an alkyl(meth)acrylate-based unit. Herein, the alkyl(meth)acrylate-based unit means both an alkylacrylate-based unit and an alkylmethacrylate-based unit, and the alkyl group of the alkyl(meth)acrylate-based unit preferably has a carbon number of 1 to 10, and more preferably has a carbon number of 1 to 4.

In addition, the monomer unit capable of being copolymerized with the (meth)acrylate-based unit may include a styrene-based unit, a maleic anhydride-based unit, a maleimide-based unit and the like. Herein, examples of the styrene-based unit may include, but are not limited to, styrene, α-methylstyrene and the like; examples of the maleic anhydride-based monomer may include, but are not limited to, maleic anhydride, methyl maleic anhydride, cyclohexyl maleic anhydride, phenyl maleic anhydride and the like; and examples of the maleimide-based monomer may include, but are not limited to, maleimide, N-methylmaleimide, N-cyclohexylmaleimide, N-phenylmaleimide and the like. These may be used either alone or as a mixture.

Meanwhile, the acryl-based film may be a film including a (meth)acrylate-based resin having a lactone ring structure. Specific examples of the (meth)acrylate-based resin having a lactone ring structure may include a (meth)acrylate-based resin having a lactone ring structure disclosed in Japanese Patent Application Laid-Open Publication No. 2000-230016, Japanese Patent Application Laid-Open Publication No. 2001-151814 and Japanese Patent Application Laid-Open Publication No. 2002-120326, and the like.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then molding the result to a film, or the acryl-based film may be prepared by preparing a (meth)acrylate-based resin, other polymers, additives and the like as a separate solution, then forming a uniformly mixed solution by mixing the separately prepared solutions, and molding the result to a film. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

Meanwhile, the polarizing plate of the present invention may further include a primer layer in between the adhesive layer and the protective film for further improving adhesive strength. Herein, the primer layer may be formed using a method of applying a coating solution including a water dispersible polymer resin, water dispersible fine particles and water on the protective film using a bar coating method, a gravure coating method or the like, and drying the result. Examples of the water dispersible polymer resin may include a water dispersible polyurethane-based resin, a water dispersible acryl-based resin, a water dispersible polyester-based resin or a combination thereof, and as the water dispersible fine particles, inorganic-based fine particles such as silica, titania, alumina and zirconia, organic-based fine particles formed with a silicone-based resin, a fluorine-based resin, a (meth)acryl-based resin, a cross-linked polyvinyl alcohol and a melamine-based resin or a combination thereof, may be used, but the examples are not limited thereto.

3. Optical Member

Next, an optical member according to the present invention will be described.

An optical member of the present invention includes a display panel; and a polarizer attached to an external-most surface of the display panel through a medium of an adhesive layer, wherein the adhesive layer is formed using the radical-curable adhesive composition of the present invention described above.

3-1. Display Panel

First, a display panel capable of being used in the present invention is not particularly limited, and for example, various modes of liquid crystal panels used in liquid crystal display devices may be used. Herein, specific constitutions of the liquid crystal panel are not particularly limited, and for example, the constitution may include upper transparent substrate/color filter/protective film/transparent conductive film electrode/oriented film/liquid crystal/oriented film/thin film transistor/lower transparent substrate, and the like.

The optical member of the present invention may have a polarizer attached to the external-most surface, that is, an upper transparent substrate or a lower transparent substrate, of a display panel through a medium of an adhesive layer, and herein, the adhesive layer is formed using the radical-curable adhesive composition of the present invention described above. Meanwhile, materials of the transparent substrate to which a polarizer is attached through a medium of an adhesive layer are not particularly limited, and known glass substrates or transparent polymer films may be used without limit.

3-2. Polarizer

Next, the polarizer is not particularly limited as described above, and polarizers well known in the art, for example, films formed with polyvinyl alcohol (PVA) including iodine or dichroic dye may be used. In addition, as described above, the polarizer may be prepared by dyeing a PVA film with iodine or dichroic dye, however, the preparation method is not particularly limited thereto.

Meanwhile, the polarizer may attach a separate protective film on the surface opposite to the surface attached to a display panel through a medium of an adhesive layer in order for supporting and protecting the polarizer. Herein, the details of the protective film are the same as those described above.

Meanwhile, attaching the polarizer and the protective film may be carried out using a method of applying an adhesive on the surface of the polarizer or the protective film using a roll coater, a gravure coater, a bar coater, a knife coater or a capillary coater and the like, and then laminating the result with heat using a laminating roll, or laminating by pressing the result at room temperature, or irradiating UV after laminating the result, or the like. Meanwhile, the adhesive is not limited to the radical-curable adhesive of the present invention described above, and various adhesives for a polarizing plate used in the art, such as a polyvinyl alcohol-based adhesive, a polyurethane-based adhesive, an acryl-based adhesive, and a cation-based or radical-based adhesive may be used without limit.

3-3. Adhesive Layer

Next, the adhesive layer is formed using the radical-curable adhesive composition of the present invention described above, and may be formed through an in-line process well known in the art. Specifically, the formation of the adhesive layer may be carried out using, for example, a method in which the radical-curable adhesive composition of the present invention is applied on the surface of a polarizer using a coating method well known in the art, while unwiding the polarizer or a polarizing plate in which a protective film is attached to one surface of the polarizer from a roll, then laminating the result on a display panel, and curing the coated adhesive composition layer. Herein, both photocuring and heat curing may be used as the curing as described above, and the heat curing may be additionally carried out after the photocuring, or the photocuring may be additionally carried out after the heat curing. The adhesive layer of the present invention may be formed through an in-line process as described above, and therefore, has an advantage in that productivity is excellent such that continuous production may be achieved.

Meanwhile, the adhesive layer may have a thickness of approximately greater than 0 and less than or equal to 10 µm, and preferably approximately 0.1 to 10 µm or 0.1 to 5 µm. As for existing acryl-based adhesives commonly used for attaching a polarizer (or polarizing plate) to a display panel, at least a thickness of 20 µm is required in order to maintain proper adhesive strength, therefore, manufacturing thin display devices including this adhesive has had a limit, however, the adhesive layer of the present invention may be formed to be thin as described above, therefore, there is an advantage in that display devices including this adhesive layer may be manufactured to be thinner.

Hereinafter, the present invention will be described in more detail with reference to specific examples.

Preparation Example 1—Preparation of Acryl-Based Protective Film

Raw material pellets were prepared by supplying a resin composition obtained by uniformly mixing poly(N-cyclohexylmaleimide-co-methylmethacrylate), a styrene-maleic anhydride copolymer resin and a phenoxy-based resin in a weight ratio of 100:2.5:5 to a 24 ϕ extruder substituted with nitrogen from a raw material hopper to an extruder, and melting the result at 250° C.

As the phenoxy-based resin, PKFE (Mw=60,000, Mn=16,000, Tg=95° C.) manufactured by InChem Corporation (InChemRez) was used. As the styrene-maleic anhydride copolymer resin, Dylaeck 332 that is 85% by weight of styrene and 15% by weight of maleic anhydride was used, and as the poly(N-cyclohexylmaleimide-co-methylmethacrylate) resin, a compound having the N-cyclohexylmaleimide content in 6.5% by weight when analyzed using an NMR was used.

The obtained raw material pellets were vacuum dried, were melted at 260° C. using an extruder, then passed through a coat-hanger-type T-die, and then passed through a chrome plating casting roll and a drying roll, and as a result, a film having a thickness of 150 μm was prepared. An acrylic film was prepared by orienting this film to a percentage of 170% in an MD direction at 125° C. using the speed difference of the rolls with a pilot orientation apparatus.

The acrylic film prepared through the process described above was corona treated, and a primer composition, in which 20 parts by weight of an oxazoline cross-linking agent (manufactured by Nippon Shokubai Co. Ltd., WS700) was added to a primer composition having a solid content of 10% by weight prepared by diluting CK-PUD-F (urethane dispersion manufactured by Chokwang Paint Ltd.) with pure water, was coated on one surface of the acrylic film using a #7 bar, and the result was oriented to a percentage of 190% in a TD direction at 130° C. using a tenter, and finally, an acryl-based protective film having a primer layer thickness of 400 nm was prepared.

Preparation Example 2—Preparation of Adhesive Composition (1) Adhesive Composition A Adhesive Composition A for a polarizing plate was prepared by adding 3 parts by weight of irgacure-819 (manufactured by Ciba Specialty Chemicals Inc.), a radical initiator, to 100 parts by weight of a resin composition prepared by adding glyceryl monoacrylate (GLA) in 100% by weight.

(2) Adhesive Composition B

Adhesive Composition B for a polarizing plate was prepared by adding 3 parts by weight of irgacure-819 (manufactured by Ciba Specialty Chemicals Inc.), a radical initiator, to 100 parts by weight of a resin composition prepared by adding glyceryl monoacrylate (GLA) in 80% by weight and hydroxyethyl acrylate (HEA) in 20% by weight.

(3) Adhesive Composition C

Adhesive Composition C for a polarizing plate was prepared by adding 3 parts by weight of irgacure-819 (manufactured by Ciba Specialty Chemicals Inc.), a radical initiator, to 100 parts by weight of a resin composition prepared by adding glyceryl mono-methacrylate (GLM) in 80% by weight and hydroxyethyl acrylate (HEA) in 20% by weight.

(4) Adhesive Composition D

Adhesive Composition D for a polarizing plate was prepared by adding 3 parts by weight of irgacure-819 (manufactured by Ciba Specialty Chemicals Inc.), a radical initiator, to 100 parts by weight of a resin composition prepared by adding glyceryl monoacrylate (GLA) in 80% by weight and 1,4-cyclohexanedimethanol mono-acrylate in 20% by weight.

(5) Adhesive Composition E

Adhesive Composition E for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylate (HEA) in 100% by weight.

(6) Adhesive Composition F

Adhesive Composition F for a polarizing plate was prepared by adding 3 parts by weight of irgacure-819 (manufactured by Ciba Specialty Chemicals Inc.), a radical initiator, to 100 parts by weight of a resin composition prepared by adding hydroxyethyl acrylamide (HEAA) in 100% by weight.

Example 1

The Adhesive Composition A was applied on the primer layer of the acrylic film-based protective film prepared in Preparation Example 1 using a dropping pipette, and the result was laminated on both surfaces of a polarizer (PVA element), and then the result passed through a laminator (5 m/min) after setting the condition of the adhesive layer to have a final thickness of 1 to 2 μm. Next, ultraviolet rays of 1000 mJ/cm$^2$ irradiated on the surface laminated with the acrylic film using a UV irradiator (metal halide lamp), and as a result, a polarizing plate was prepared. Meanwhile, the polarizing plate was prepared under a condition of a temperature of 20° C. and humidity of 50%.

Example 2

A polarizing plate was prepared in the same manner as in Example 1 except that Adhesive Composition B was used.

Example 3

A polarizing plate was prepared in the same manner as in Example 1 except that Adhesive Composition B was used, and the polarizing plate was heat treated in an oven at 90° C. for 1 minute.

Example 4

A polarizing plate was prepared in the same manner as in Example 1 except that Adhesive Composition C was used.

Example 5

A polarizing plate was prepared in the same manner as in Example 1 except that Adhesive Composition D was used.

Comparative Example 1

A polarizing plate was prepared in the same manner as in Example 1 except that Adhesive Composition E was used.

Comparative Example 2

A polarizing plate was prepared in the same manner as in Example 1 except that Adhesive Composition F was used.

Test Example 1—Hydroxyl Value

The hydroxyl value of the adhesive composition used in Examples 1 to 5 and Comparative Examples 1 and 2 was measured and shown in the following [Table 1]. Herein, the hydroxyl value of the adhesive composition was calculated using the following Equation (1).

(Molecular Weight of KOH×Number of —OH in Sample×1000)/Molecular Weight of Sample    Equation (1):

Test Example 2—Evaluation on Peel Strength of Polarizing Plate

Peel strength of the polarizing plate prepared in Examples 1 to 5 and Comparative Examples 1 and 2 was measured, and shown in the following [Table 1]. Specifically, the polarizing plate prepared in Examples 1 to 5 and Comparative Examples 1 and 2 was left unattended for 4 days under a condition of a temperature of 20° C. and humidity of 70%, then cut into pieces having a width of 20 mm, and a length of 100 mm, and the peel strength of the polarizer and the protective film was measured at a speed of 300 m/min and 90 degrees using a texture analyzer apparatus (TA-XT Plus manufactured by Stable Micro Systems, Ltd.). Herein, the peel strength of 2.5 N/2 cm or greater was marked as ⊚, the peel strength of greater than or equal to 1.5 N/2 cm and less than 2.5 N/2 cm was marked as ○, the peel strength of greater than or equal to 1.0 N/2 cm and less than 1.5 N/2 cm was marked as X, and the peel strength of less than 1.0 N/2 cm was marked as XX.

Test Example 3—Glass Transition Temperature Measurement of Adhesive Layer

A Glass transition temperature of the cured adhesive of the polarizing plate prepared in Examples 1 to 5 and Comparative Examples 1 and 2 was measured, and shown in the following [Table 1]. Specifically, a slice of the cured adhesive of the polarizing plate prepared in Examples 1 to 5 and Comparative Examples 1 and 2 were taken and a glass transition temperature was measured using a differential scanning calorimetry (DSC, manufactured by Mettler-Toledo International, Inc.). The measurement temperature range was −30° C. to 200° C., and scanning was carried out twice by 10° C. each per minute, and the measured glass transition temperature is a glass transition temperature at the second scanning.

TABLE 1

| Category | Adhesive Composition | Hydroxyl Value [mg KOH/g] | Peel Strength | Glass Transition Temperature [° C.] |
|---|---|---|---|---|
| Example 1 | A | 768 | ○ | 160 |
| Example 2 | B | 711 | ○ | 180 |
| Example 3 | B | 711 | ○ | 180 |
| Example 4 | C | 657 | ⊚ | 100 |
| Example 5 | D | 671 | ○ | 170 |
| Comparative Example 1 | E | 483 | X | 15 |
| Comparative Example 2 | F | 487 | XX | 100 |

As shown in Table 1, in Examples 1 to 5 of the present invention including the radical-polymerizable first compound including at least two hydroxyl groups in the molecule and have hydroxyl values of 500 mg KOH/g, it was seen that excellent adhesive strength was obtained even when humidity increased, and the cured adhesive layer had a very high glass transition temperature.

However, in Comparative Examples 1 and 2 that have hydroxyl values of less than 500 mg KOH/g and do not include the radical-polymerizable first compound including at least two hydroxyl groups in the molecule, it was seen that, in Comparative Example 1, the adhesive strength was unfavorable, and the glass transition temperature was very low, and in Comparative Example 2, the glass transition temperature was relatively high, however, the adhesive strength was very unfavorable.

Next, experiments were carried out as follows in order to identify the water resistance improvement effect when the (D) compound and the (E) compound, or the (F) compound and the (G) cation initiator of the present invention were further added to the adhesive composition of the present invention.

Preparation Example 3—Preparation of Adhesive Composition (1) Adhesive Composition G Adhesive Composition G for a polarizing plate was prepared by adding 3 parts by weight of irgacure-819 (manufactured by Ciba Specialty Chemicals Inc.), a radical initiator, to 100 parts by weight of a resin composition prepared by adding glyceryl monoacrylate (GLA) in 64.5% by weight, hydroxyethyl acrylate (HEA) in 16% by weight, dimethylol tricyclodecane diacrylate (DCPDA) in 16% by weight and di-(methacryloyloxy ethyl)phosphate in 3.5% by weight.

(2) Adhesive Composition H

Adhesive Composition H for a polarizing plate was prepared by adding 3 parts by weight of CPI 100P (manufactured by San-Apro Ltd.), a cation initiator, and 3 parts by weight of irgacure-819 (manufactured by Ciba Specialty Chemicals Inc.), a radical initiator, to 100 parts by weight of a resin composition prepared by adding glyceryl monoacrylate (GLA) in 73% by weight, hydroxyethyl acrylate (HEA) in 18% by weight and glycidyl methacrylate (GMA) in 9% by weight.

Example 6

A polarizing plate was prepared in the same manner as in Example 1 except that Adhesive Composition G was used.

Example 7

A polarizing plate was prepared in the same manner as in Example 1 except that Adhesive Composition H was used.

Test Example 4—Evaluation on Water Resistance of Polarizing Plate

Water resistance of the polarizing plate prepared in Examples 6 and 7 was measured and shown in the following [Table 2]. Specifically, the polarizing plates of Examples 6 and 7 were laminated on a glass substrate, and then immersed in a thermostat at 60° C., and water resistance was determined after 8 hours by the discoloration at the end of the polarizing plate, and when there was no discoloration, it was marked as excellent, and when there was discoloration, it was marked as poor. Meanwhile, methods for measuring hydroxyl values, peel strength and glass transition temperatures additionally listed in the following Table 2 are the same as those described above.

TABLE 2

| Category | Adhesive Composition | Water Resistance | Hydroxyl Value [mg KOH/g] | Peel Strength | Glass Transition Temperature [° C.] |
|---|---|---|---|---|---|
| Example 6 | G | Excellent | 576 | ⊚ | 180 |
| Example 7 | H | Excellent | 630 | ○ | 160 |

As shown in Table 2, it was identified that, when the (D) compound and the (E) compound, or the (F) compound and the (G) cation initiator of the present invention were further added to the adhesive composition of the present invention as in Examples 6 and 7 of the present invention, the glass transition temperature was high, adhesive strength was very superior, and furthermore, water resistance was also very superior.

Next, an experiment was carried out as follows in order to show that the adhesive composition of the present invention is also useful in attaching a polarizer to a display panel.

Example 8

The Adhesive Composition A was applied on a glass substrate, and a polarizer (PVA element) and an upper protective film were laminated thereon, and then the result passed through a laminator (5 m/min) after setting the condition of the adhesive layer to have a final thickness of 1 to 2 μm. Next, ultraviolet rays of 1000 mJ/cm$^2$ irradiated on the surface laminated with the polarizer and the protective film using a UV irradiator (metal halide lamp), and as a result, an optical member in which the polarizer is attached to the glass substrate was prepared. Meanwhile, the optical member was prepared under a condition of a temperature of 20° C. and humidity of 50%.

Test Example 5—Evaluation on Peel Strength of Optical Member

Peel strength of the polarizing plate prepared in Example 8 was measured, and shown in the following [Table 3]. Specifically, the optical member prepared in Example 8 was left unattended for 4 days under a condition of a temperature of 20° C. and humidity of 70%, then cut into pieces having a width of 20 mm, and a length of 100 mm, and the peel strength of the polarizer and the glass substrate was measured at a speed of 300 m/min and 90 degrees using a texture analyzer apparatus (TA-XT Plus manufactured by Stable Micro Systems, Ltd.). Herein, the peel strength of 2.0 N/2 cm or greater was marked as excellent, the peel strength of greater than or equal to 1.0 N/2 cm and less than 2.0 N/2 cm was marked as fair, and the peel strength of less than 1.0 N/2 cm was marked as poor. Meanwhile, methods for measuring the hydroxyl value and the glass transition temperature additionally listed in the following Table 3 were the same as those described above.

TABLE 3

| Category | Adhesive Composition | Peel Strength | Hydroxyl Value [mg KOH/g] | Glass Transition Temperature [° C.] |
|---|---|---|---|---|
| Example 8 | A | Excellent | 768 | 160 |

As shown in Table 3, it was seen that the adhesive composition of the present invention also had excellent adhesive strength between the polarizer and the glass substrate.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. A radical-curable adhesive composition comprising:
a (A) radical-polymerizable first compound including at least two hydroxyl groups in the molecule;
a (B) radical-polymerizable second compound including at least one hydrophilic functional group in the molecule; and
a (C) radical initiator,
wherein the radical-curable adhesive composition has a hydroxyl value of 657 to 768 mg KOH/g,
wherein the (A) radical-polymerizable first compound including at least two hydroxyl groups in the molecule is included in an amount of 5 to 90 parts by weight; the (B) radical-polymerizable second compound including at least one hydrophilic functional group in the molecule is included in an amount of 5 to 90 parts by weight; and the (C) radical initiator is included in an amount of 0.5 to 20 parts by weight, with respect to 100 parts by weight of the radical-curable adhesive composition,
wherein the (B) radical-polymerizable second compound is a compound excluding the (A) radical-polymerizable first compound,
wherein the (A) radical-polymerizable first compound includes one or more types selected from the group consisting of compounds represented by the following [Chemical Formula 1] to [Chemical Formula 17]:

[Chemical Formula 1]
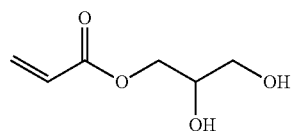

[Chemical Formula 2]
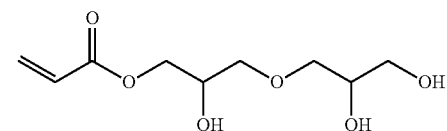

[Chemical Formula 3]
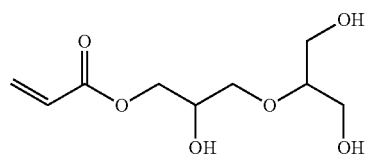

[Chemical Formula 4]
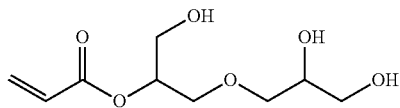

[Chemical Formula 5]

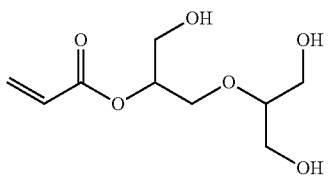

[Chemical Formula 6]

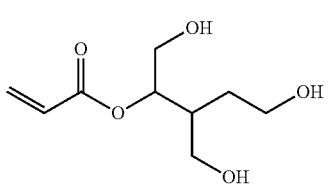

[Chemical Formula 7]

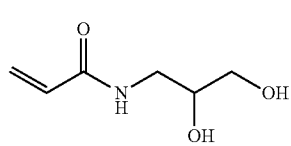

[Chemical Formula 8]

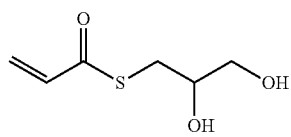

[Chemical Formula 9]

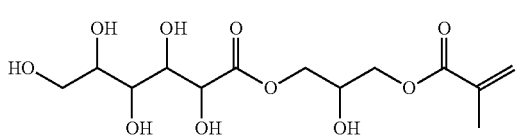

[Chemical Formula 10]

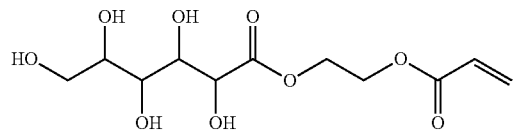

[Chemical Formula 11]

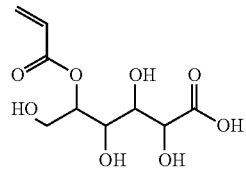

[Chemical Formula 12]

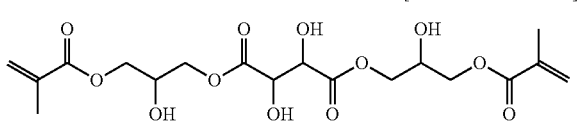

[Chemical Formula 13]

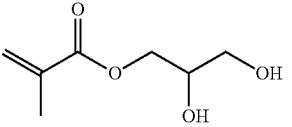

[Chemical Formula 14]

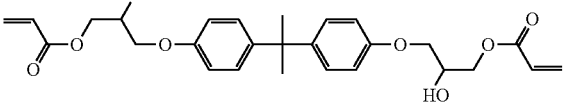

[Chemical Formula 15]

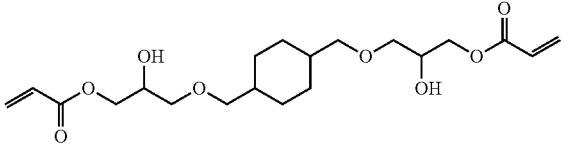

[Chemical Formula 16]

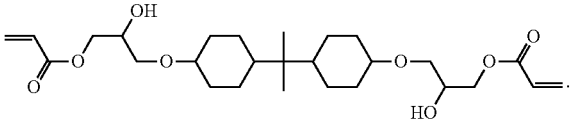

[Chemical Formula 17]

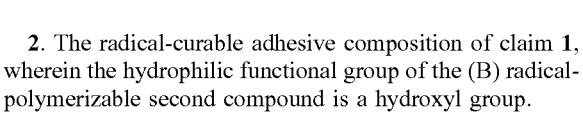

2. The radical-curable adhesive composition of claim 1, wherein the hydrophilic functional group of the (B) radical-polymerizable second compound is a hydroxyl group.

3. The radical-curable adhesive composition of claim 1, wherein the (B) radical-polymerizable second compound is represented by the following [Chemical Formula I]:

[Chemical Formula I]

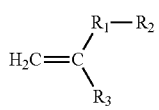

wherein, in [Chemical Formula I], $R_1$ is an ester group or an ether group; $R_2$ is a $C_{1-10}$ alkyl group, a $C_{4-10}$ cycloalkyl group or a combination thereof, and herein, $R_2$ has one hydroxyl substituent in the molecule; and $R_3$ is hydrogen or a substituted or unsubstituted $C_{1-10}$ alkyl group.

4. The radical-curable adhesive composition of claim 1, wherein the (B) radical-polymerizable second compound includes one or more types selected from the group consisting of compounds represented by the following [Chemical Formula 18] to [Chemical Formula 23]:

[Chemical Formula 18]

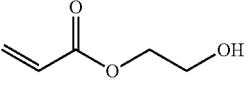

[Chemical Formula 19]

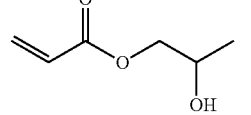

-continued

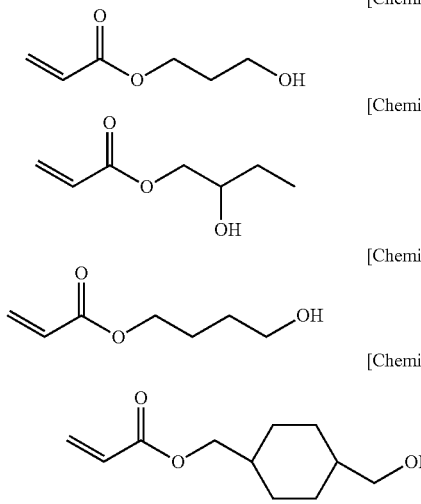

5. The radical-curable adhesive composition of claim 1, further comprising:
   a (D) multifunctional (meth)acryl-based compound;
   a (E) phosphate compound including at least one (meth)acrylic group in the molecule; or
   a combination thereof.

6. The radical-curable adhesive composition of claim 5, wherein the (D) multifunctional (meth)acryl-based compound is included in 4 to 50 parts by weight with respect to 100 parts by weight of the radical-curable adhesive composition.

7. The radical-curable adhesive composition of claim 5, wherein the (E) phosphate compound including at least one (meth)acrylic group in the molecule is included in 0.5 to 30 parts by weight with respect to 100 parts by weight of the radical-curable adhesive composition.

8. The radical-curable adhesive composition of claim 1, further comprising:
   an (F) epoxy compound including at least one epoxy group in the molecule; and
   a (G) cation initiator.

9. The radical-curable adhesive composition of claim 8, wherein the (F) epoxy compound including at least one epoxy group in the molecule is included in 1 to 30 parts by weight with respect to 100 parts by weight of the radical-curable adhesive composition.

10. The radical-curable adhesive composition of claim 8, wherein the (G) cation initiator is included in 0.5 to 15 parts by weight with respect to 100 parts by weight of the radical-curable adhesive composition.

11. The radical-curable adhesive composition of claim 1, which is cured by photocuring or heat curing.

12. The radical-curable adhesive composition of claim 1, which has a glass transition temperature of 50° C. or higher after curing.

13. A polarizing plate comprising:
   a polarizer;
   an adhesive layer formed on at least one surface of the polarizer; and
   a polarizer protective film formed on the adhesive layer;
   wherein the adhesive layer is formed using the radical-curable adhesive composition of claim 1.

14. An optical member comprising:
   a display panel; and
   a polarizer attached to an external-most surface of the display panel through a medium of an adhesive layer;
   wherein the adhesive layer is formed using the radical-curable adhesive composition of claim 1.

* * * * *